United States Patent [19]
Blakey

[11] 3,846,917
[45] Nov. 12, 1974

[54] MEASURING AND LOCATING SYSTEM COMPONENTS

[76] Inventor: Alexander G. Blakey, San Diego, Calif.

[22] Filed: July 30, 1973

[21] Appl. No.: 383,928

Related U.S. Application Data

[62] Division of Ser. No. 300,547, Oct. 25, 1972, Pat. No. 3,793,738.

[52] U.S. Cl............ 33/180 R, 33/172 R, 33/174 H, 269/321 A, 335/285
[51] Int. Cl.......................... G01b 5/14, G01b 3/30
[58] Field of Search.......... 33/180 R, 185 R, 174 H, 33/DIG. 1; 335/285; 269/321 A

[56] References Cited
UNITED STATES PATENTS

| | | | |
|---|---|---|---|
| 2,415,259 | 2/1947 | Renton | 269/321 A |
| 3,188,078 | 6/1965 | Peterson | 33/170 |
| 3,425,134 | 2/1969 | Christensen | 33/174 B |
| 3,722,360 | 3/1973 | Blakey et al. | 33/180 R |

Primary Examiner—Harry N. Haroian
Assistant Examiner—John W. Shepperd
Attorney, Agent, or Firm—John R. Duncan; Hugo F. Mohrlock

[57] ABSTRACT

Components from which a measuring and locating system may be assembled and a method of assembling them are disclosed. The basic component is a thin planar tile having a plurality of openings in one surface arranged in a repeating uniform geometric pattern. The openings contain magnetic inserts having uniformly recessed upper surfaces. A contiguous array of these tiles may be assembled in which the highly accurate opening pattern continues across the entire array. Measuring and locating fixtures having ferromagnetic base protuberances arranged to conform to the insert recess shape and pattern may be removably mounted on the tile assembly to perform a wide variety of measuring and locating functions.

6 Claims, 6 Drawing Figures

MEASURING AND LOCATING SYSTEM COMPONENTS

CROSS-REFERENCE TO RELATED APPLICATION

This application is a division of U.S. Pat. application Ser. No. 300,547, now U.S. Pat. No. 3,793,738 filed Oct. 25, 1972.

BACKGROUND OF THE INVENTION

Recently, there has been invented a measuring and locating system using large flat surfaced plates having a plurality of uniform recesses (often special in shape) spaced across the surface. Magnetic attraction means are located adjacent to each recess. Measuring and locating fixtures are mounted on ferromagnetic protuberances (often, spheres) conforming in shape and spacing to the recesses. This system is sometimes called a "magnaflat" system as a coined term indicating the combination of the magnetic attraction means and a flat surface plate. These fixtures can easily be removed and replaced in exactly the same position. This system is described in greater detail in copending U.S. Pat. application Ser. No. 25,713 now U.S. Pat. No. 3,723,927, filed Apr. 6, 1970, assigned to the assignee of this application.

This magnaflat system has proven to have a great number of advantages over prior systems which used threaded inserts to hold fixtures, or used massive, heavy fixtures to prevent accidental displacement during inspection, measurement, machining or other operations. Fixtures held to the recesses by magnetic attraction cannot be easily accidentally displaced, but can be removed by an upward pull overcoming the magnetic force. Fixture set-ups can be removed, stored for extended periods, then reassembled quickly and accurately.

While the over-all magnaflat system as initially conceived was a dramatic improvement in the field of large measuring and quality control systems, some problems remain. Where large parts and tools are to be checked or measured, the surface plate must be very large, heavy and cumbersome. Generally, the plates have a geneally rectangular surface to accommodate the widest variety of fixture arrangements. Such a plate, however, cannot easily handle large parts of unusual shapes. For example, a large "L" shaped part would be best inspected and measured on a correspondingly "L" shaped surface plate. But, building a specialized plate for a limited measuring and inspecting program has not been economically feasible.

Sometimes it may be preferable to have both a standard smooth surfaced plate for some purposes and a magnaflat plate having the described pattern of magnetic recesses for others. Such redundancy, however, is expensive and space consuming. Similarly, it may be desirable to be able to use either a standard work holding table or a magnaflat table in certain machining operations, such as milling. It has been difficult to conveniently interchange the two types in the past.

Thus, there is a continuing need for improvements in measuring and locating systems to lower the cost of the system, and increase system flexibility.

SUMMARY OF THE INVENTION

It is, therefore, an object of this invention to provide components for a measuring and locating system which overcome the above-noted problems.

Another object of this invention is to provide a measuring and locating system of improved configurational simplicity and flexibility.

Another object is to provide a method of assembling measuring and locating systems in a wide variety of configurations from standardized components.

Still another object of this invention is to provide a simple, inexpensive and flexible method for converting conventional surface plate arrangements for use with the magnaflat system.

The above objects, and others, are accomplished in accordance with this invention by a measuring and locating system and assembly method based on thin planar tiles which have plurality of openings (which may extend partially or entirely through the tile) in one surface, each of which contains a magnetic insert. The openings are arranged in a uniform repeating geometric pattern. Each insert contains a magnetic attraction means and is adapted to be secured in one of said openings with the upper surface substantially flush, but preferably just below, the tile surface. The insert upper surfaces have uniform recesses formed therein. Each tile, then, resembles a small plate of the sort described in copending U.S. Pat. application Ser. No. 25,713 now U.S. Pat. No. 3,723,927, filed Apr. 6, 1970.

A large magnaflat system may be built up from a plurality of these tiles by placing the tiles in a contiguous arrangement on a substantially flat table surface. As detailed below, adjacent tiles are precisely positioned using a positioning tool so that the opening pattern continues precisely over all tiles, then locking means are activated to lock the tiles together in the desired relationship.

A method and height adjusting means are also provided to align the upper surfaces of all the tiles in a precise plane.

The resulting magnaflat assembly is usable for measuring, locating, machining, quality control, etc. in the same manner as prior magnaflat assemblies, as described in copending U.S. Pat. applications Ser. Nos. 126,023 now U.S. Pat. No. 3,722,360, 126,022 now U.S. Pat. No. 3,711,929, and 126,021 now U.S. Pat. No. 3,723,928, all filed Mar. 19, 1971, and 25,713 now U.S. Pat. No. 3,723,927 filed Apr. 6, 1970.

BRIEF DESCRIPTION OF THE DRAWING

Details of the invention and of a preferred embodiment thereof will be further understood upon reference to the drawing, wherein.

DETAILED DESCRIPTION OF THE INVENTION

Figure 1:
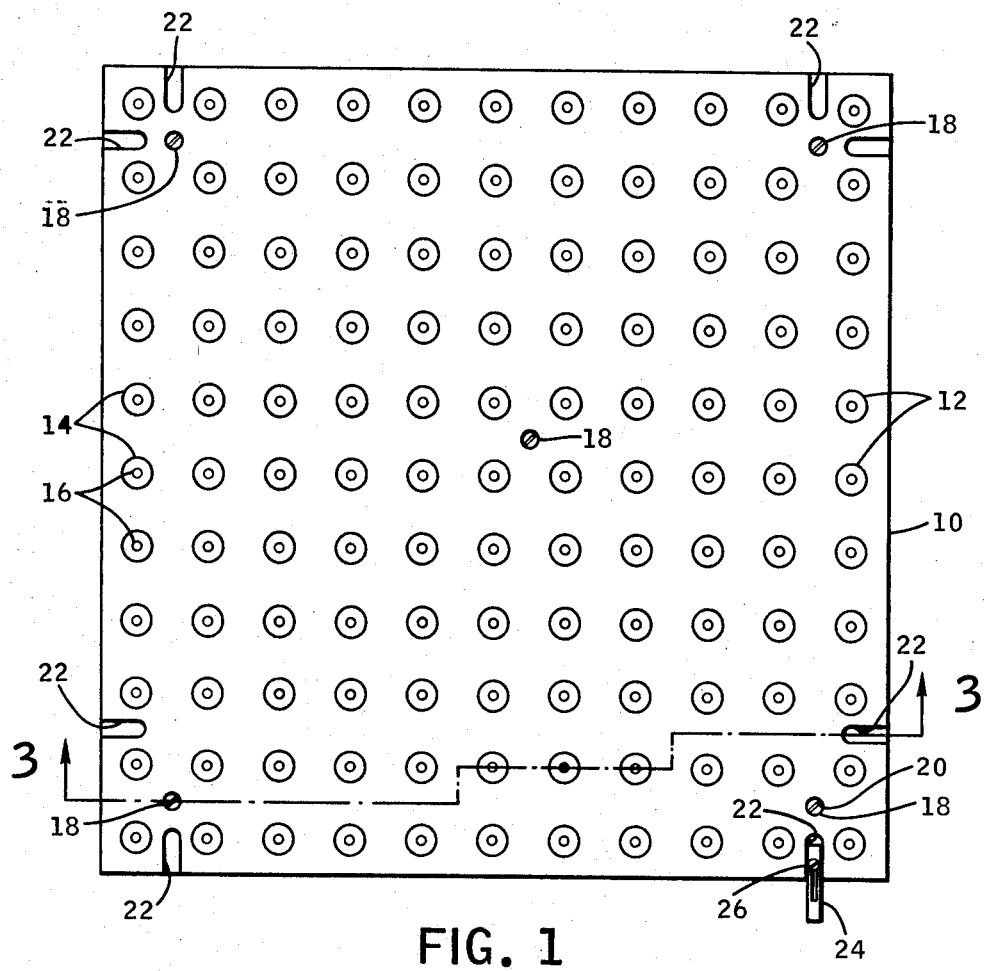
FIG. 1 is a plan view of a magnaflat tile according to this invention.

Referring now to FIG. 1, there is seen a tile 10 having a plurality of uniformly spaced openings 12 in which magnetic inserts 14 are secured. This tile 10 is the basic component of the present variable magnaflat measuring and indicating system.

Figure 2:
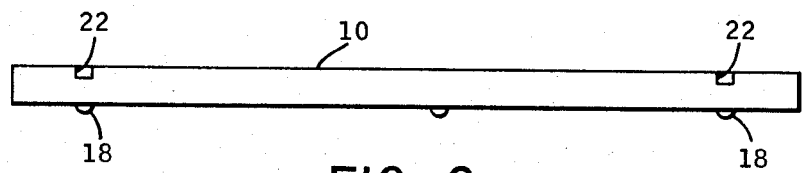
FIG. 2 is a view of the tile of FIG. 1 in elevation.

The upper surface of tile 10 should be very flat, preferably within 0.0005 T.I.R. As seen in FIG. 2, the lower surface of tile 10 is substantially parallel to the upper surface.

While openings 12 may be formed in any suitable repeating geometric pattern, the repeating square pattern shown in FIG. 1 is preferred since it can accommodate a wide variety of fixtures and can easily be continued across a number of contiguous tiles. In the preferred embodiment, shown in the drawings, openings 12 are formed as pockets in the upper surface of plate 12 in which magnetic inserts of the sort shown in FIGS. 3, 6, and 7 of copending U.S. Pat. application Ser. No. 126,022, now U.S. Pat. No. 3,711,929 filed Mar. 19, 1971, are secured. Alternatively, openings 12 may be in the form of shallow recesses to directly receive fixture protuberances (as described below) with the permanent or electromagnetic attraction means located in pockets behind openings 12.

Tile 10 may be produced in any suitable way. Typically, granite or other stone materials may be used and the surfaces ground in a conventional manner. Or, the tiles may be cast in substantially the final configuration from a ceramic or plastic material, then finish ground. Non-magnetic metals, such as aluminum, may be formed into tiles by conventional machining techniques.

Figure 3:
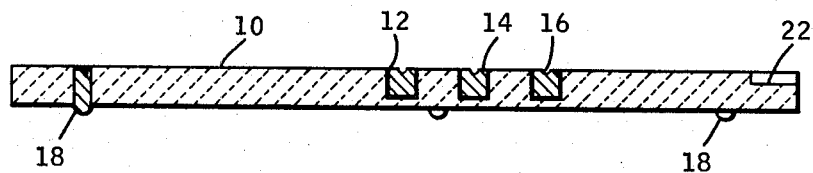
FIG. 3 is a section through the tile of FIG. 1 taken on line 3—3.

The height and levelness of the upper surface of tile 10 above the table or other surface upon which the tile is supported may be adjusted by a plurality of setscrews 18 in threaded holes 20 in tile 10 as seen in FIGS. 1 and 3. Setscrews 18 bear directly on the tile supporting surface. If the support surface is very flat, such as a large granite surface plate, the setscrews 18 on a number of tiles 10 may be pre-set so that all of the tiles have uniform heights, then the tiles may be quickly placed on the surface plate and locked together as described below. If the support surface is more irregular, the height of each tile relative to a selected datum plane may be adjusted after each tile is placed on the support.

A plurality of grooves 22 is formed in the upper edges of each tile, located so as to align with adjacent tiles. After the positions of adjacent tiles are adjusted, as discussed below, the tiles may be locked together to form larger magnaflat plates. Where a substantially permanent assembly is desired, small aluminum bars may be inserted into grooves 22, bridging the gap between adjacent tiles, and cemented into place, such as by an epoxy glue. Where easy disassembly is required, typically grooves 22 may each have a threaded hole in the lower groove surface, a slotted bar 24 may be installed between adjacent grooves, and bolts 26 may be passed through the slots and tightened in place, as illustrated in the lower right hand corner of FIG. 1.

Figures 4, 5:
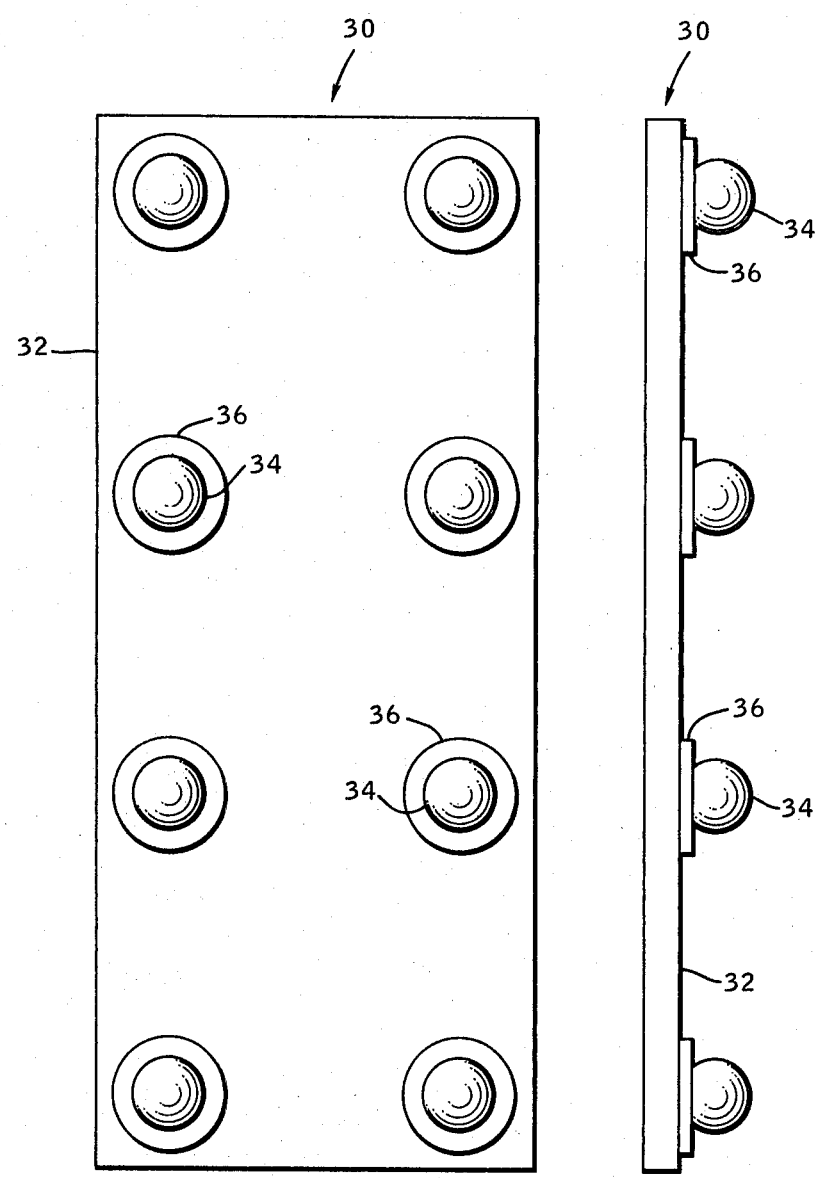
FIG. 4 is a plan view of the underside of an orientation tool.
FIG. 5 is an elevation view of the tool of FIG. 4, taken on line 5—5.

A tool 30 for orienting two adjacent tiles 10 is illustrated in FIGS. 4 and 5. Tool 30 consists of a plate 32 having a plurality of support members 34 secured to one surface. In this embodiment, each support member 34 is spherical and is secured to a washer-like ring 36. Typically, each support member 34 is welded or brazed to a ring 36, then these assemblies are bonded to plate 32 by an epoxy adhesive. These preferred support members 34 are described in greater detail in copending U.S. Pat. application Ser. No. 126,021, now U.S. Pat. No. 3,723,928 filed Mar. 19, 1971. As a minimum, tool 30 should have at least two rows of two support members. For greater accuracy, longer rows and more rows may be used. Excellent results are obtained with two rows of four members, as illustrated in FIGS. 4 and 5.

Tool 30 may be easily and quickly assembled by merely placing loose support members 34 in two adjacent rows of recesses 16 in a magnaflat plate, which could be tile 10 as shown in FIG. 1. A small amount of an adhesive is then placed on the upper surface of each ring 36, plate 32 is placed over and in firm contact with rings 36 and the adhesive is cured. The resulting tool 30 may then be lifted off of the magnaflat plate against the force of the magnetic attraction means.

Figure 6:
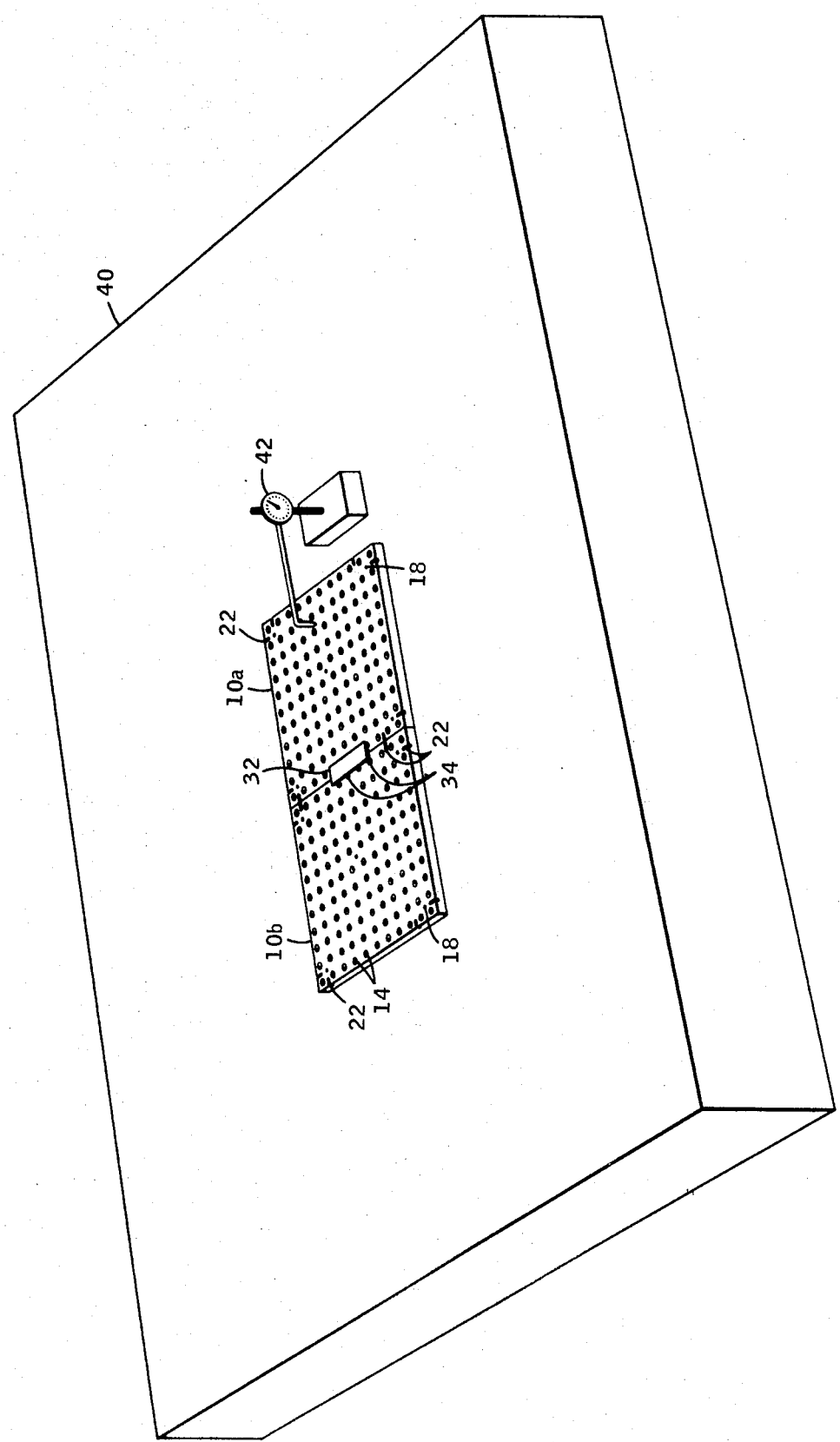
FIG. 6 illustrates in a perspective view the tile orientation set-up.

The assembly of two tiles 10 to produce a longer magnaflat plate, using tool 30, is illustrated in FIG. 6.

A first tile 10a is placed on the surface of a large, conventional granite surface plate 40 which has a very flat surface. A conventional height gage 42 is placed next to tile 10a and setscrews 18 are adjusted until the upper surface of tile 10a is level and at the desired height above the surface of plate 40. Tile 10b is then placed on surface plate 40 next to tile 10a and is leveled and adjusted for height using gage 42 in a similar manner. Tool 30 is then installed with one row of support members 34 engaging one edge row of recesses 16 on tile 10a and the other row of support members 34 engaging an edge row of recesses 16 on tile 10b. Height gage 42 is then positioned with the indicator in contact with the upper surface of tool 30. Tile 10b is gently tapped and moved into position where gage 42 gives a minimum height reading. The minimum height occurs when support members 34 are fully seated in recesses 16 and the distance between the edge rows of tiles 10a and 10b is precisely the same as the distance between adjacent rows of recesses within each tile. Then, the two tiles are secured together by a fastening means, either permanent of removable, within adjacent grooves 22. In a similar manner, additional tiles 10 may be added to give a final magnaflat plate of the desired size and shape.

A preferred method of making the tiles and assemblying them into a magnaflat plate is described in the following example.

EXAMPLE

A number of tiles as shown in FIG. 1 are formed from a crystalline ceramic material available under the "Pyroceram" trademark from the Corning Glass Works by conventional ceramic molding techniques. Each tile has a surface which is about 21⅞ inches square. Openings having diameters of about 0.812 inch and depth of about 0.875 inch are formed on 2-inch centers across the tile, with the centers of the edge row of openings being about 15/16 inch from the edge. Edge grooves are formed in the upper surface about 2 inches from each corner. Each groove is about 1 inch long, 7/16 inch deep and 7/16 inch wide. The molded tiles are then each ground to a uniform thickness of about 0.998 inch and the upper surface is ground to a flatness within 0.0005 T.I.R. Five holes are drilled and tapped in each tile, at the center and each corner, for 3/8-24 setscrews, which are then installed. Magnetic inserts having spherically concave upper surface and containing a permanent magnet are bedded in an epoxy resin filler in each opening. Each magnet has a length of about 3/4 inch and a diameter of about 5/8 inch. A tool similar to that shown in FIG. 4, but with a much greater number of accurately located support members, is placed over the tile with support members engaging the magnetic inserts. The resin is allowed to cure, accurately fixed the inserts in place. One completed tile then is placed on a large granite surface plate and, using a conventional height gage, the setscrews are adjusted to bring the upper surface of the tile parallel to and 1 inch from the surface of the plate. A second tile is placed on the plate and similarly adjusted for height. Then, the aligning tool is installed with the two rows of support members engaging the outer row of recesses in each tile. The positions of the tiles are adjusted until a height indicator enagaing the upper tool surface gives a minimum reading. Then 3/8-inch by 3/8-inch by 2-inch aluminum bars are bonded to the aligned grooves in the two tiles with an epoxy adhesive, which is then allowed to cure. Additional tiles are similarly added. The result is a large magnaflat plate with a uniform pattern of recesses extending across the entire plate.

While certain preferred materials, arrangements and components are described in the above description of a preferred embodiment, these may be varied, where suitable, with similar results.

Other applications, ramifications and variation of the present invention will occur to those skilled in the art upon reading this disclosure. These are intended to be included within the scope of this invention, as defined in the appended claims.

I claim:

1. A measuring and locating system which comprises:

a thin planar tile having a plurality of recesses formed in one substantially flat surface;
said recesses arranged in a uniform repeating geometric pattern;
said tile adapted to be placed in contiguous relationship with other similar tiles on a substantially flat table surface so that said recess pattern is extended over a greater area;
positioning means adapted to contact adjacent tiles and position them in a selected spatial relationship;
locking means to secure adjacent tiles in a fixed relationship when located as desired; and
height adjusting means in each tile to level the tile and set the height thereof.

2. The system according to claim 1 wherein said positioning means comprises a tool having a plurality of protuberances projecting therefrom corresponding in shape and spacing to the shape and spacing of said recesses, said tool adapted to engage recesses in both of two adjacent tiles to position said tiles so that said uniform repeating geometric pattern continues uniformly across both tiles.

3. The system according to claim 1 wherein said locking means comprises grooves in the upper edges of said tiles, said grooves located such that grooves in adjacent tiles are in alignment and form one continuous groove when the tiles are properly aligned, and bar means adapted to be placed in said one groove and be secured to said tiles.

4. The system according to claim 1 wherein said height adjusting means comprises a plurality of setscrews threaded through said tiles and extending beyond the surface opposite to said recessed surface and contacting said table surface, whereby adjustment of said setscrews raises and lowers said tiles relative to said table surface.

5. The system according to claim 1 wherein each of said recesses is formed in the upper surface of a permanent magnet means which is secured in an opening in said tile surface.

6. A measuring and locating system which comprises:

a plurality of thin tiles each having a plurality of substantially uniform recesses formed in one tile surface;
said recesses in each tile arranged in a uniform geometric pattern;
said tiles adapted to be placed in contiguous relationship to each other across a table surface;
positioning means comprising a tool having a plurality of protuberances projecting therefrom in a pattern corresponding to the spacing of said recesses, said tool adapted to engage recesses in both of two adjacent tiles to position said tiles with respect to each other;
locking means comprising cooperating grooves in the upper edges of adjacent tiles which, when aligned, form a continuous groove and bar means adapted to be placed in said continuous groove and be secured to both of said adjacent tiles; and
height adjusting means in each tile to level each tile and set the height thereof by raising or lowering the tile relative to said table surface at at least one of several points across the tile.

* * * * *